(12) United States Patent
Bond et al.

(10) Patent No.: US 12,136,341 B2
(45) Date of Patent: Nov. 5, 2024

(54) AUGMENTED REALITY DISPLAY FOR TRAFFIC SIGNAL AWARENESS

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US); John P. Weiss, Shelby Township, MI (US); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 17/814,106

(22) Filed: Jul. 21, 2022

(65) Prior Publication Data

US 2024/0029559 A1    Jan. 25, 2024

(51) Int. Cl.
| | |
|---|---|
| G08G 1/0967 | (2006.01) |
| B60K 35/00 | (2024.01) |
| G02B 27/01 | (2006.01) |
| G06T 7/70 | (2017.01) |
| G06T 7/90 | (2017.01) |

(Continued)

(52) U.S. Cl.
CPC ....... *G08G 1/096716* (2013.01); *B60K 35/00* (2013.01); *G02B 27/0101* (2013.01); *G06T 7/70* (2017.01); *G06T 7/90* (2017.01); *G06V 20/584* (2022.01); *G09G 3/002* (2013.01); *B60K 35/23* (2024.01); *B60K 35/28* (2024.01); *B60K 2360/177* (2024.01); *B60K 2360/21* (2024.01); *G02B 2027/0138* (2013.01); *G02B 2027/014* (2013.01); *G02B 2027/0141* (2013.01); *G06T 2207/10024* (2013.01); *G06T 2207/30196* (2013.01); *G06T 2207/30252* (2013.01); *G06T 2207/30268* (2013.01);

(Continued)

(58) Field of Classification Search
CPC .. G08G 1/096716; B60K 35/00; B60K 35/23; B60K 35/28; B60K 2360/177; B60K 2360/21; G02B 27/0101; G02B 2027/0138; G02B 2027/014; G02B 2027/0141; G02B 27/01; G06T 7/70; G06T 7/90; G06T 2207/10024; G06T 2207/30196; G06T 2207/30252; G06T 2207/30268; G06V 20/584; G09G 3/002; G09G 2340/045; G09G 2340/0464; G09G 2354/00; G09G 2380/10
See application file for complete search history.

(56) References Cited

U.S. PATENT DOCUMENTS 10,067,341 B1 * 9/2018 Breed ................. G06V 20/597
2010/0253541 A1 * 10/2010 Seder ................. G08G 1/0962
                                                    340/905

(Continued)

*Primary Examiner* — Mohamed Barakat
(74) *Attorney, Agent, or Firm* — Vivacqua Crane, PLLC

(57) ABSTRACT

A system for displaying information for a vehicle includes a plurality of vehicle sensors, a display, and a controller in electrical communication with the plurality of vehicle sensors and the display. The controller is programmed to detect a relevant traffic signal in an environment surrounding the vehicle using the plurality of vehicle sensors, receive information about the relevant traffic signal using the plurality of vehicle sensors, determine a status of the relevant traffic signal based on the received information, and display a graphic based on the status of the relevant traffic signal using the display.

19 Claims, 5 Drawing Sheets

(51) Int. Cl.
*G06V 20/58* (2022.01)
*G09G 3/00* (2006.01)
*B60K 35/23* (2024.01)
*B60K 35/28* (2024.01)

(52) U.S. Cl.
CPC ............... *G09G 2340/045* (2013.01); *G09G 2340/0464* (2013.01); *G09G 2354/00* (2013.01); *G09G 2380/10* (2013.01)

(56) References Cited

U.S. PATENT DOCUMENTS

| | | | |
|---|---|---|---|
| 2011/0182475 A1* | 7/2011 | Fairfield | G05D 1/0212 |
| | | | 382/104 |
| 2015/0097866 A1* | 4/2015 | Mochizuki | G02B 27/017 |
| | | | 345/633 |
| 2015/0321606 A1* | 11/2015 | Vartanian | G02B 27/0179 |
| | | | 348/148 |
| 2017/0013188 A1* | 1/2017 | Kothari | H04N 7/181 |
| 2017/0124869 A1* | 5/2017 | Popple | G08G 1/087 |
| 2023/0135641 A1* | 5/2023 | Miyake | G06V 20/588 |
| | | | 701/36 |

* cited by examiner

AUGMENTED REALITY DISPLAY FOR TRAFFIC SIGNAL AWARENESS

INTRODUCTION

The present disclosure relates to an augmented reality head-up display for generating a notification to provide information about a traffic signal which is relevant to the driving task.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the driver's forward field of view. Accordingly, the head-up display provides drivers with information without looking away from the road. One possible implementation for augmented reality is an augmented reality head-up display (AR-HUD) for a vehicle. By overlaying images on the windscreen, AR-HUDs enhance a driver's view of the environment outside the vehicle, creating a greater sense of environmental awareness. Enhanced environmental awareness may be especially important for drivers having a disability such as, for example, color-vision impairment.

Therefore, while current augmented reality head-up displays achieve their intended purpose, there is a need in the art for an improved approach for providing information to vehicle occupants.

SUMMARY

According to several aspects, a system for displaying information for a vehicle is provided. The system includes a plurality of vehicle sensors, a display, and a controller in electrical communication with the plurality of vehicle sensors and the display. The controller is programmed to detect a relevant traffic signal in an environment surrounding the vehicle using the plurality of vehicle sensors, receive information about the relevant traffic signal using the plurality of vehicle sensors, determine a status of the relevant traffic signal based on the received information, and display a graphic based on the status of the relevant traffic signal using the display.

In another aspect of the present disclosure, the plurality of vehicle sensors further may include an external camera, and to detect the relevant traffic signal in the environment surrounding the vehicle, the controller is further programmed to capture an image of the environment surrounding the vehicle using the external camera and identify the relevant traffic signal by analyzing the image.

In another aspect of the present disclosure, to determine the status of the relevant traffic signal, the controller is further programmed to determine a complexity of the relevant traffic signal using the image, identify one of a plurality of lights of the traffic signal as an illuminated light using the image, and determine a color of the illuminated light of the traffic signal using the image.

In another aspect of the present disclosure, the plurality of vehicle sensors further may include a global positioning system (GPS) and a vehicle communication system. To detect the relevant traffic signal in the environment surrounding the vehicle, the controller is further programmed to determine a location of the vehicle using the GPS and receive a transmission from a traffic signal using the vehicle communication system, where the transmission contains a location of the traffic signal. To detect the relevant traffic signal in the environment surrounding the vehicle, the controller is further programmed to compare the location of the vehicle to the location of the traffic signal and determine the traffic signal to be the relevant traffic signal based on the comparison of the location of the vehicle and the location of the traffic signal.

In another aspect of the present disclosure, to receive information about the relevant traffic signal using the plurality of vehicle sensors, the controller is further programmed to receive a transmission from the relevant traffic signal using the vehicle communication system, where the transmission contains information about the relevant traffic signal.

In another aspect of the present disclosure, to determine the status of the relevant traffic signal, the controller is further programmed to determine a complexity of the relevant traffic signal based on the transmission, identify one of a plurality of lights of the relevant traffic signal as an illuminated light based on the transmission, and determine a color of the illuminated light of the relevant traffic signal based on the transmission.

In another aspect of the present disclosure, to receive information about the relevant traffic signal using the plurality of vehicle sensors, the controller is further programmed to transmit a request to a remote database using the vehicle communication system, where the request includes a request for information about the relevant traffic signal. To receive information about the relevant traffic signal using the plurality of vehicle sensors, the controller is further programmed to receive a transmission from the remote database using the vehicle communication system, where the transmission includes at least one of: a complexity of the relevant traffic signal, an illuminated light of the relevant traffic signal, and a color of the illuminated light of the relevant traffic signal.

In another aspect of the present disclosure, the display is an augmented reality head-up display (AR-HUD) system in electronic communication with the controller, where the AR-HUD system includes a driver position tracking device and an AR-HUD projector. To display the graphic the controller is further programmed to determine a position of a driver of the vehicle using the driver position tracking device, calculate a size, shape, and location of the graphic based on the position of the driver and data from the plurality of vehicle sensors, and display the graphic corresponding to the status of the relevant traffic signal on a windscreen of the vehicle using the augmented reality head up display system based on the size, shape, and location.

In another aspect of the present disclosure, the display further includes a transparent windscreen display (TWD) system in electronic communication with the controller, where the transparent windscreen display system includes transparent phosphors embedded in the windscreen of the vehicle and a TWD projector. To display the graphic the controller is further programmed to calculate a size, shape, and location of the graphic based on data from the plurality of vehicle sensors and display the graphic corresponding to the status of the relevant traffic signal on the windscreen of the vehicle using the TWD system based on the size, shape, and location.

In another aspect of the present disclosure, to display the graphic the controller is further programmed to update the graphic based on at least one of: a location of the vehicle and a complexity of the relevant traffic signal.

According to several aspects, a method for displaying graphics upon a windscreen of a vehicle is provided. The method includes detecting a relevant traffic signal in an environment surrounding the vehicle using a vehicle sensor, receiving information about the relevant traffic signal using a vehicle sensor, determining a status of the relevant traffic signal based on the received information, and displaying a graphic based on the status of the relevant traffic signal.

In another aspect of the present disclosure, detecting a relevant traffic signal further may include capturing an image of the environment surrounding the vehicle using the external camera and identifying the relevant traffic signal by analyzing the image.

In another aspect of the present disclosure, detecting a relevant traffic signal further may include determining a location of the vehicle using a global positioning system (GPS) and receiving a transmission from a traffic signal using a vehicle communication system, where the transmission contains a location of the traffic signal. Detecting a relevant traffic signal further may include comparing the location of the vehicle to the location of the traffic signal and determining the traffic signal to be the relevant traffic signal based on the comparison of the location of the vehicle and the location of the traffic signal.

In another aspect of the present disclosure, receiving information about the relevant traffic signal further may include determining a V2I (vehicle-to-infrastructure) status of the relevant traffic signal, where the V2I status includes a V2I available status and a V2I unavailable status and capturing an image of the relevant traffic signal using an exterior camera in response to determining that the V2I status of the relevant traffic signal is the V2I unavailable status. Receiving information about the relevant traffic signal further may include receiving a transmission from a traffic signal using a vehicle communication system in response to determining that the V2I status of the relevant traffic signal is the V2I available status, where the transmission includes at least one of: a complexity of the relevant traffic signal, an illuminated light of the relevant traffic signal, and a color of the illuminated light of the relevant traffic signal.

In another aspect of the present disclosure, determining the status of the relevant traffic signal further may include determining the complexity of the relevant traffic signal using at least one of: the image and the transmission, identifying one of a plurality of lights of the traffic signal as the illuminated light using at least one of: the image and the transmission, and determining a color of the illuminated light of the traffic signal using at least one of: the image and the transmission.

In another aspect of the present disclosure, displaying the graphic further may include determining a distance between the vehicle and the relevant traffic signal using at least one of: the image, the transmission, and a global positioning system (GPS); comparing the distance between the vehicle and the relevant traffic signal to a predetermined distance range, and comparing the complexity of the relevant traffic signal to a predetermined complexity threshold. Displaying the graphic further may include displaying the graphic in response to determining that the distance between the vehicle and the relevant traffic signal is within the predetermined distance range and that the complexity of the relevant traffic signal is greater than or equal to the predetermined complexity threshold.

In another aspect of the present disclosure, displaying the graphic further may include calculating a size, shape, and location of the graphic based on data from at least one of: an exterior camera, a global positioning system (GPS) and a driver position tracking device. Displaying the graphic further may include displaying the graphic corresponding to the status of the relevant traffic signal on the windscreen of the vehicle using at least one of: a transparent windscreen display (TWD) system and an augmented reality head-up display (AR-HUD) system based on the size, shape, and location.

According to several aspects, a system for displaying information for a vehicle is provided. The system includes a plurality of vehicle sensors including an exterior camera, a global positioning system (GPS), and a vehicle communication system. The system also includes a display system including an augmented reality head-up display (AR-HUD) system and a transparent windscreen display (TWD) system. The system also includes a controller in electrical communication with the plurality of vehicle sensors and the display system. The controller is programmed to detect a relevant traffic signal in an environment surrounding the vehicle using the plurality of vehicle sensors, receive a status, a complexity, and a location relative to the vehicle of the relevant traffic signal using the plurality of vehicle sensors, and display a graphic based on the status, the complexity, and the location relative to the vehicle of the relevant traffic signal using the display system.

In another aspect of the present disclosure, to detect the relevant traffic signal, the controller is further programmed to capture an image of the environment surrounding the vehicle using the exterior camera and analyze the image using a machine learning algorithm to identify the relevant traffic signal.

In another aspect of the present disclosure, to display the graphic, the controller is further programmed to display the graphic indicating the status of the relevant traffic signal based on the complexity and the location relative to the vehicle of the relevant traffic signal, where the status of the relevant traffic signal includes an illuminated light and a color of the illuminated light.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
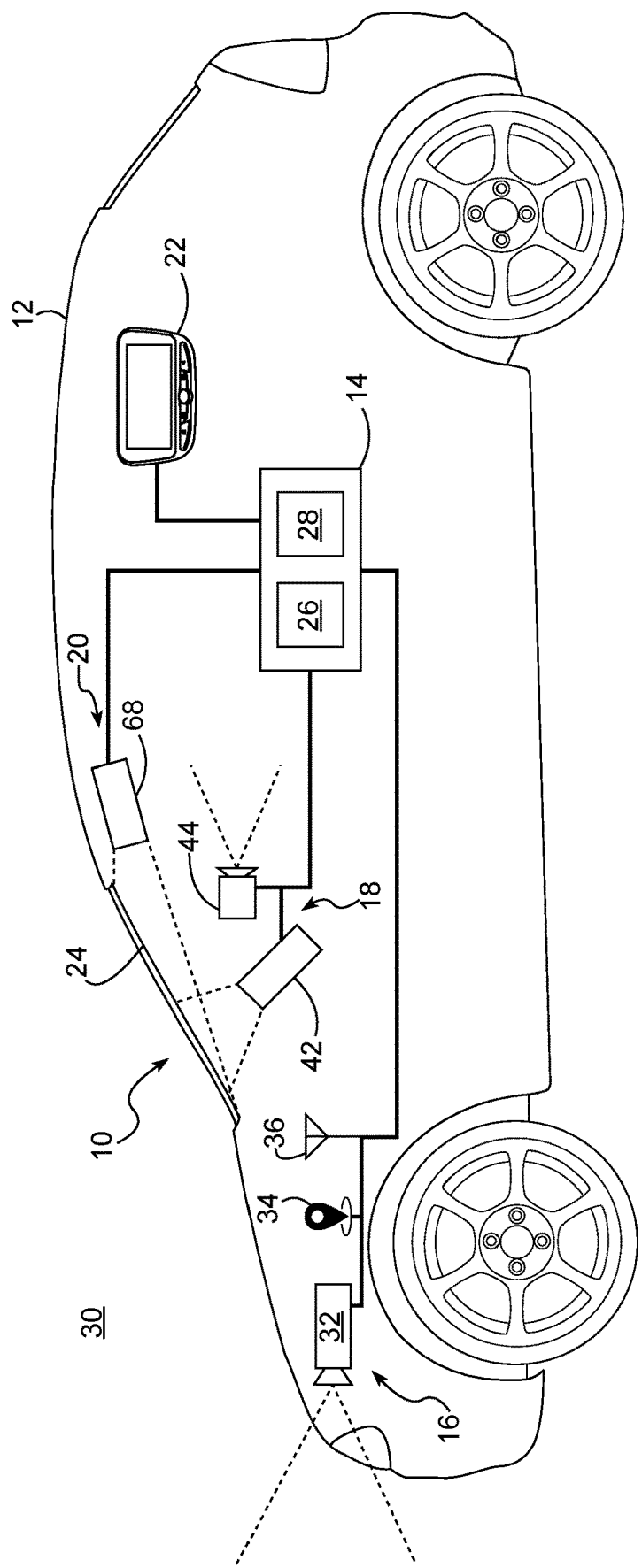
FIG. 1 is a schematic diagram of a system for displaying information about a traffic signal according to an exemplary embodiment.

Referring to FIG. 1, a system for displaying information about a traffic signal is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, vehicle sensors 16, an augmented reality head-up display (AR-HUD) system 18, a transparent windscreen display (TWD) system 20, and a human-machine interface (HMI) 22.

The controller 14 is used to implement a method 100 for displaying information about a traffic signal upon a windscreen 24 of the vehicle 12, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 28 may include volatile and nonvolatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the vehicle sensors 16, the AR-HUD system 18, the TWD system 20, and the HMI 22. The electrical communication may be established using, for example, a CAN bus, a Wi-Fi network, a cellular data network, or the like. It should be understood that various additional wired and wireless techniques and communication protocols for communicating with the controller 14 are within the scope of the present disclosure.

The vehicle sensors 16 are used to acquire information about an environment 30 surrounding the vehicle 12. In an exemplary embodiment, the vehicle sensors 16 include an exterior camera 32, a global positioning system (GPS) 34, and a vehicle communication system 36. The vehicle sensors 16 are in electrical communication with the controller 14 as discussed above.

The exterior camera 32 is used to capture images and/or videos of the environment 30 surrounding the vehicle 12. In an exemplary embodiment, the exterior camera 32 is a photo and/or video camera which is positioned to view the environment 30 in front of the vehicle 12. In one example, the exterior camera 32 is affixed inside of the vehicle 12, for example, in a headliner of the vehicle 12, having a view through the windscreen 24. In another example, the exterior camera 32 is affixed outside of the vehicle 12, for example, on a roof of the vehicle 12, having a view of the environment 30 in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GPS 34 is used to determine a geographical location of the vehicle 12. In an exemplary embodiment, the GPS 34 includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. It should be understood that various additional types of satellite-based radionavigation systems, including additional types of global navigation satellite systems (GNSS) are within the scope of the present disclosure.

The vehicle communication system 36 is used by the controller 14 to communicate with other systems external to the vehicle 12. For example, the vehicle communication system 36 includes capabilities for communication with vehicles ("V2V" communication), infrastructure ("V2I" communication), remote systems at a remote call center (e.g., ON-STAR by GENERAL MOTORS) and/or personal devices. In certain embodiments, the vehicle communication system 36 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 36 may include one or more antennas and/or communication transceivers for receiving and/or transmitting signals, such as cooperative sensing messages (CSMs). The vehicle communication system 36 is configured to wirelessly communicate information between the vehicle 12 and another vehicle. Further, the vehicle communication system 36 is configured to wirelessly communicate information between the vehicle 12 and infrastructure or other vehicles.

Figure 2:
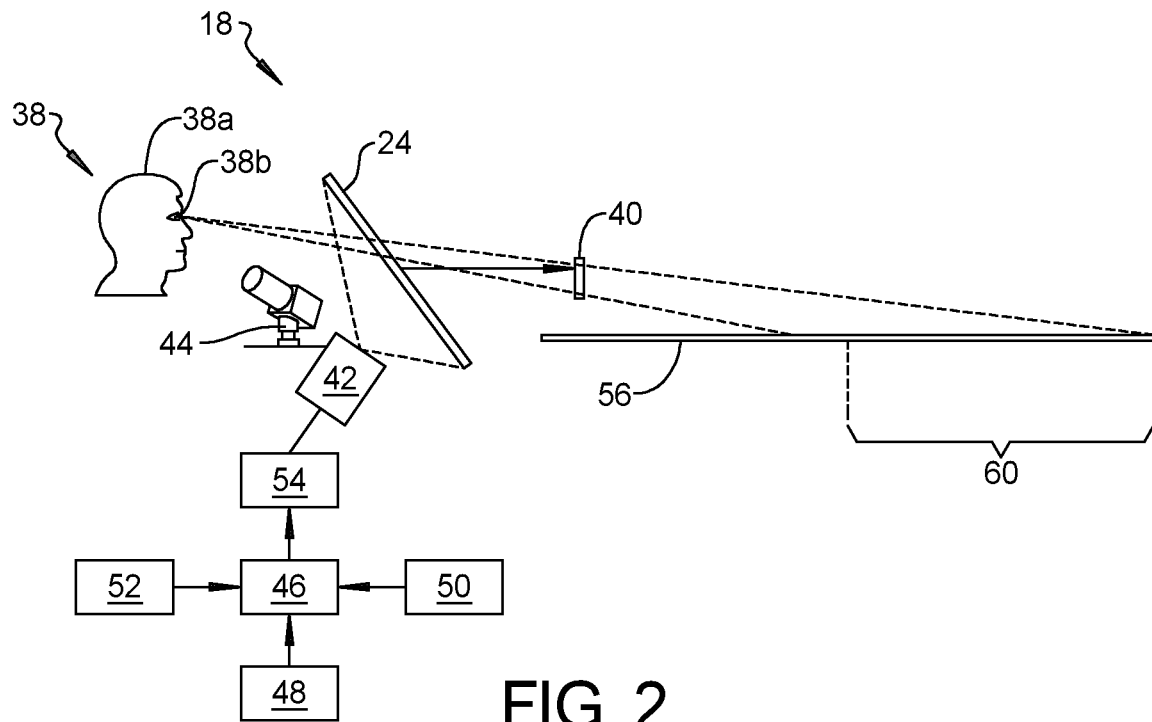
FIG. 2 is a schematic diagram of an AR-HUD system for use by an exemplary driver according to an exemplary embodiment.

Referring to FIG. 2, a system diagram of the AR-HUD system 18 for use by an exemplary driver 38 is shown. The AR-HUD system 18 is used to display AR-HUD graphics 40 (i.e., notification symbols providing visual information to the driver 38) on the windscreen 24 of the vehicle 12. The AR-HUD system 18 includes an AR-HUD projector 42 and a driver position tracking device 44. The AR-HUD system 18 is in electrical communication with the controller 14 as discussed above.

The AR-HUD projector 42 is used to project the AR-HUD graphics 40 on the windscreen 24 of the vehicle 12. It should be understood that various devices designed to project images including, for example, optical collimators, laser projectors, digital light projectors (DLP), and the like are within the scope of the present disclosure.

The driver position tracking device 44 is used to determine a position of a driver 38 in the vehicle 12. For example, the driver position tracking device 44 may track a position of a head 38a or eyes 38b of the driver 38. The position of the driver 38 in the vehicle 12 from the driver position tracking device 44 is used to locate the AR-HUD graphic 40 on a windscreen 24 of the vehicle 12. In an exemplary embodiment, the driver position tracking device 44 is one or more cameras disposed in the vehicle 12.

To operate the AR-HUD system 18, the controller 14 includes multiple software modules, including a system manager 46. During operation of the system 10, the system manager 46 receives at least a first input 48, a second input 50, and a third input 52. The first input 48 is indicative of the location of the vehicle 12 in space (i.e., the geographical location of the vehicle 12), the second input 50 is indicative of the vehicle driver 38 position in the vehicle 12 (e.g., the position of the eyes and/or head of the driver 38 in the vehicle 12), and the third input 52 is data pertaining to a relevant traffic signal, as will be discussed in greater detail below. The first input 48 may include data such as GNSS data (e.g., GPS data), vehicle speed, roadway curvature, and vehicle steering, and this data is collected from the vehicle sensors 16. The second input 50 is received from the driver position tracking device 44. The third input 52 is data pertaining to the relevant traffic signal in the environment 30 surrounding the vehicle 12. The system manager 46 is configured to determine (e.g., compute) the type, size, shape, and color of the AR-HUD graphics 40 to be displayed using the AR-HUD projector 42 based on the first input 48 (i.e., the vehicle location in the environment 30), the second input 50 (e.g., the position of the eyes 38b and/or head 38a of the driver 38 in the vehicle 12), and the third input 52 (i.e. the data pertaining to the relevant traffic signal in the environment 30 surrounding the vehicle 12) The system manager 46 instructs an image engine 54, which is a software module or an integrated circuit of the AR-HUD projector 42 or the controller 14, to display the AR-HUD graphic 40 using the AR-HUD projector 42. The image engine 54 displays the AR-HUD graphic 40 on the windscreen 24 of the vehicle 12 using the AR-HUD projector 42 based on the type, size, shape, and color of the AR-HUD graphic 40 determined by the system manager 46. The AR-HUD graphic 40 is projected on the windscreen 24 by the AR-HUD projector 42 to show the AR-HUD graphic 40 along a roadway surface 56.

Figure 3:
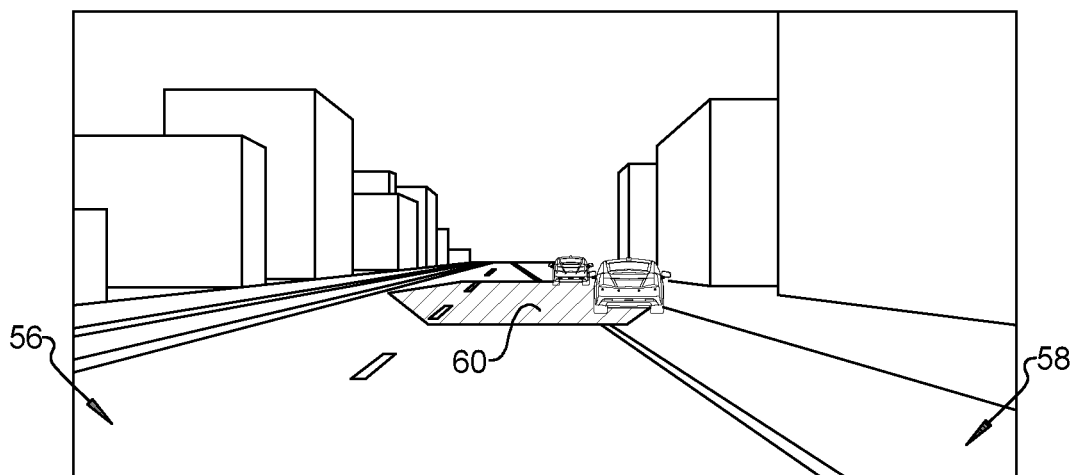
FIG. 3 is a schematic front view of a dual-focal plane augmented reality display, highlighting a second image plane of the dual-focal plane augmented reality display according to an exemplary embodiment.
Figure 4:
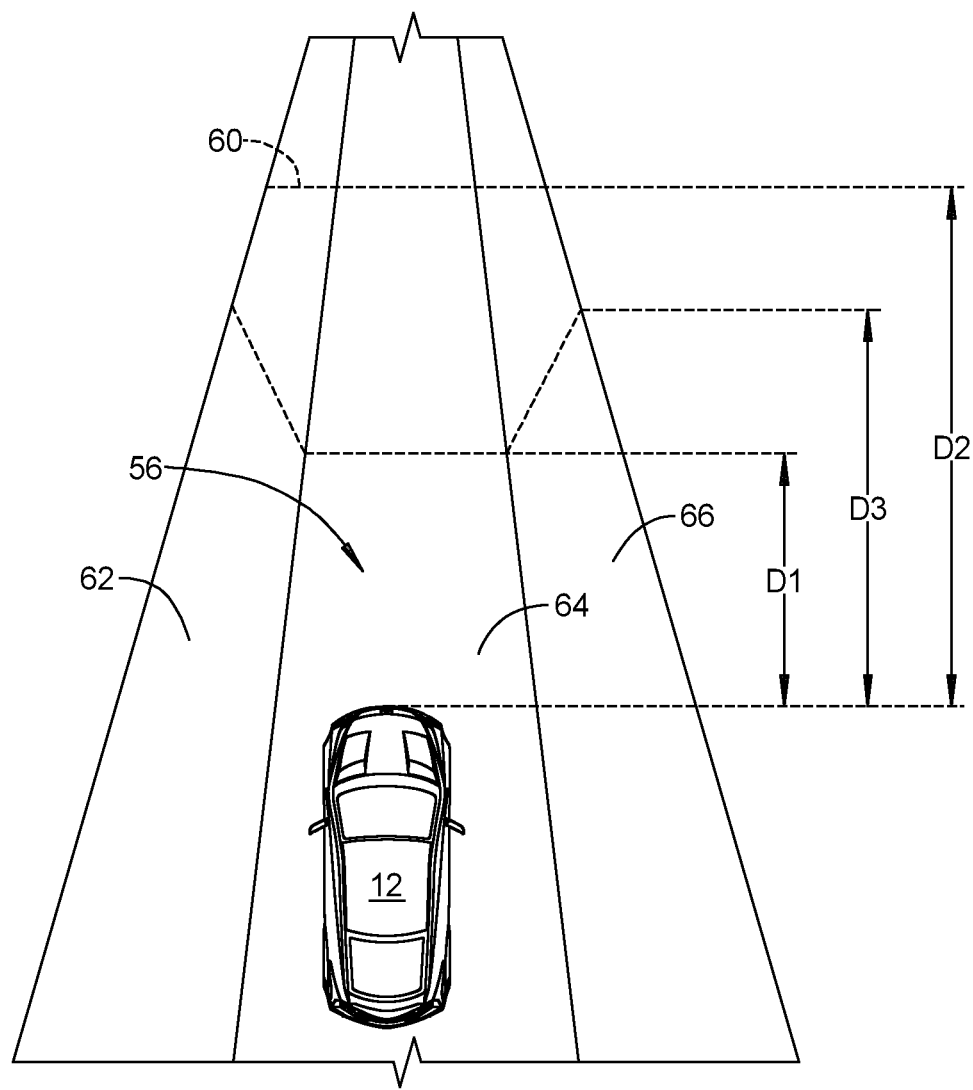
FIG. 4 is a schematic diagram of the second image plane of the dual-focal plane augmented according to an exemplary embodiment.

In the exemplary embodiment of the present disclosure, the AR-HUD system 18 is a dual-focal plane AR-HUD system. With reference to FIGS. 3 and 4 and with continued reference to FIG. 2, the AR-HUD system 18 has a first image plane 58 and a second image plane 60. The first image plane 58 shows the view of the outside world, and the second image plane 60 is reserved for displaying the AR-HUD graphics 40. The second image plane 60 spans multiple lanes and the AR-HUD graphics 40 appear at a location farther on a roadway surface 56 relative to the first image plane 58. For instance, as shown in FIGS. 3 and 4, the second image plane 60 covers a left lane 62, a central lane 64, and a right lane 66. As a non-limiting example, in the central lane 64, the second image plane 60 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the driver 38 see the AR-HUD graphics 40 displayed using the AR-HUD projector 42. In the left lane 62 and the right lane 66, the second image plane 60 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the driver 38 see the AR-HUD graphics 40 displayed using the AR-HUD projector 42. As used herein, the term "dual-focal plane AR-HUD" means an AR-HUD system that presents images in a first image plane and a second image plane, wherein the first image plane and the second image plane are at different locations. It is desirable to configure the AR-HUD system 18 as a dual-focal plane AR-HUD to facilitate manipulation of the AR-HUD graphics 40 on the view of the outside word. For instance, by using a dual-focal plane AR-HUD, the size, location, and characteristics of the AR-HUD graphics 40 may be changed based on, for example, the location of the eyes 38b of the driver 38.

The TWD system 20 is used to display images on the windscreen 24 of the vehicle 12. In an exemplary embodiment, the AR-HUD system 18 can display the AR-HUD graphics 40 in a predefined region of the windscreen 24 (e.g., in the first image plane 58 and the second image plane 60). The TWD system 20 can display TWD graphics (not shown) in any region of the windscreen 24. Therefore, by operating the AR-HUD system 18 and the TWD system 20 in conjunction, the controller 14 may display graphics in any region of the windscreen 24. In an exemplary embodiment, the TWD system 20 includes transparent phosphors (not shown) embedded into the windscreen 24 and a TWD projector 68 (FIG. 1). The TWD system 20 is in electrical communication with the controller 14 as discussed above.

The transparent phosphors are light emitting particles which fluoresce in response to being excited by the TWD projector 68. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 68 is used to excite the transparent phosphors in a predetermined pattern to produce the TWD graphics on the windscreen 24. In an exemplary embodiment, the TWD projector 68 is a violet/ultraviolet laser projector disposed proximally to the headliner of the vehicle 12. The TWD projector 68 includes three lasers, each laser configured to excite one of the red, green, or blue transparent phosphors.

In an exemplary embodiment, the HMI 22 is used in addition to the AR-HUD system 18 and the TWD system 20 to display information about the relevant traffic signal. In another exemplary embodiment, the HMI 22 is used instead of the AR-HUD system 18 and/or the TWD system 20 to display information about the relevant traffic signal. In the aforementioned exemplary embodiments, the HMI 22 is a display system located in view of the driver 38 and capable of displaying text, graphics, and/or images. It is to be understood that HMI display systems including LCD displays, LED displays, and the like are within the scope of the present disclosure. Further exemplary embodiments where the HMI 22 is disposed in a rearview mirror are also within the scope of the present disclosure. The HMI 22 is in electrical communication with the controller 14 as discussed above.

Figure 5:
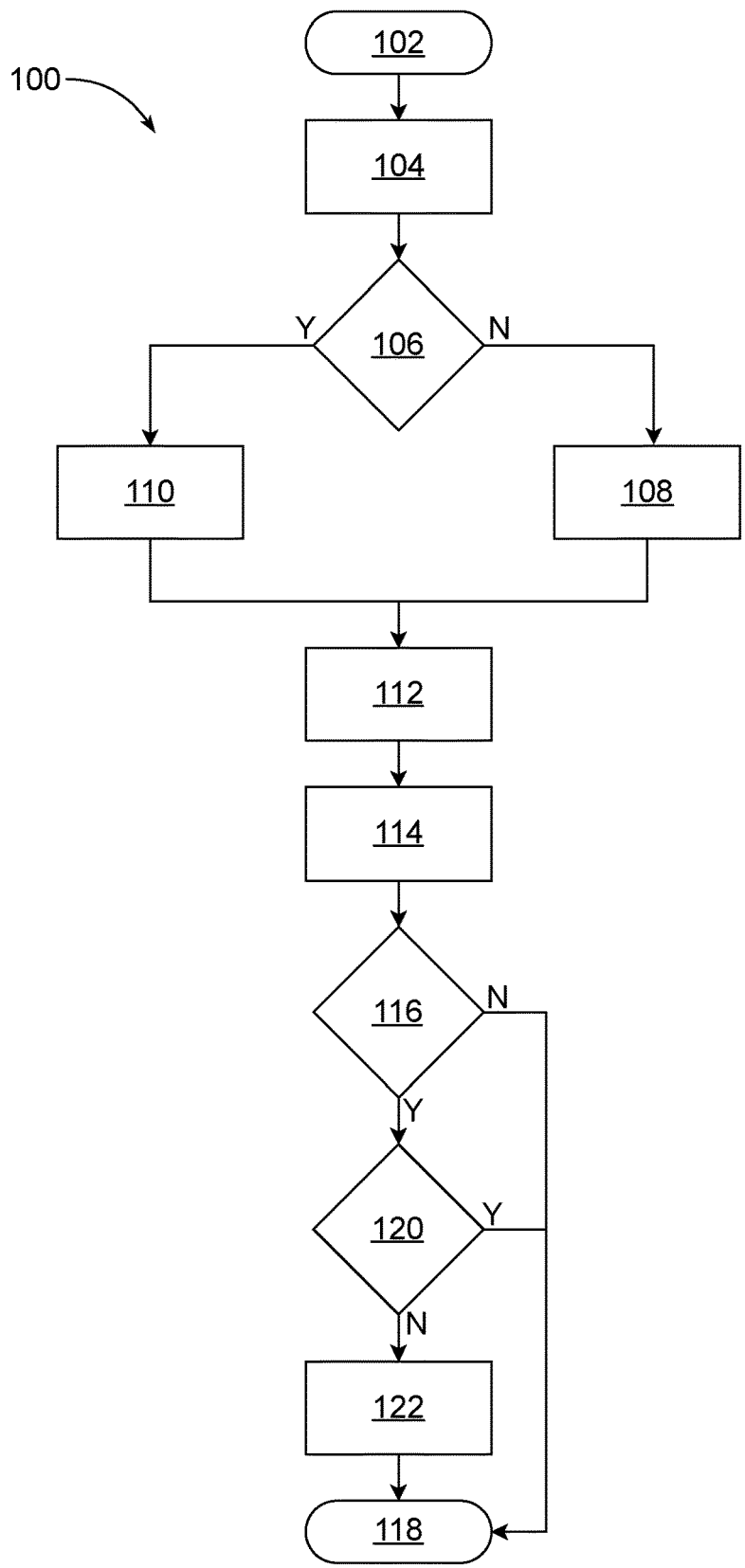
FIG. 5 is a flowchart of a method for displaying information about a traffic signal upon a windscreen of a vehicle according to an exemplary embodiment.

Referring to FIG. 5, a flowchart of the method 100 for displaying information about a traffic signal upon a windscreen 24 of the vehicle 12 is shown according to an exemplary embodiment. The method 100 begins at block 102 and proceeds to block 104. At block 104, the vehicle sensors 16 are used to identify relevant traffic signals in the environment 30. In the present disclosure, the term relevant traffic signal refers to a traffic signal which is relevant to the driving task (e.g., a traffic signal located on a road upon which the vehicle 12 is driving, directly ahead of the vehicle 12). In an exemplary embodiment, the exterior camera 32 captures an image of the environment 30, and the controller 14 analyzes the image of the environment 30 to identify relevant traffic signals. In a non-limiting example, the controller 14 analyzes the image using a machine learning algorithm (e.g., a neural network). The machine learning algorithm is trained by providing the algorithm with a plurality of image samples of relevant traffic signals which have been pre-identified. For example, the plurality of image samples may include images of various types and configurations of traffic signals in various environmental conditions and with varying relevance to the driving task. After sufficient training of the machine learning algorithm, the algorithm can identify relevant traffic signals in an image captured with the exterior camera 32 with a high accuracy and precision. In another exemplary embodiment, the vehicle communication system 36 is used to receive transmissions from a traffic signal identifying a location of the traffic signal. The location received from the traffic signal is compared to a location of the vehicle 12 as determined by the GPS 34. Based on the comparison between the location of the traffic signal and the location of the vehicle 12, the traffic signal may be identified as a relevant traffic signal. In a non-limiting example, if the distance between the traffic signal and the vehicle 12 is below a predetermined threshold, and the vehicle 12 is oriented such that the traffic signal is within a field-of-view of the driver 38, the traffic signal is identified as a relevant traffic signal. In yet another exemplary embodiment, the vehicle communication system 36 is further used to connect to a database located on a remote system (e.g., a server computer connected to the internet). The database provides information about traffic signals which is used to identify the relevant traffic signal. It is to be understood that the three aforementioned exemplary embodiments may be performed mutually exclusively, sequentially, and/or simultaneously within the scope of the present disclosure. After block 104, the method 100 proceeds to block 106.

At block 106, the controller 14 uses the vehicle communication system 36 to attempt to connect to the relevant traffic signal identified at block 104. In an exemplary embodiment, the relevant traffic signal is in electrical communication with hardware allowing direct radiofrequency communication between the vehicle communication system 36 and the relevant traffic signal. In another exemplary embodiment, the relevant traffic signal is configured to communicate using the internet, and the vehicle communication system 36 connects to the internet, as discussed above, to establish a connection with the relevant traffic signal. If the vehicle communication system 36 is unable to communicate with the relevant traffic signal, the method 100 proceeds to block 108. If the vehicle communication system 36 is able to communicate with the relevant traffic signal, the method 100 proceeds to block 110.

At block 108, the controller 14 uses the exterior camera 32 to capture an image of the relevant traffic signal. The image is used to determine a status and complexity of the relevant traffic signal. In the present disclosure, the status of the relevant traffic signal refers to which of a plurality of lights of the relevant traffic signal are illuminated, the color of the illuminated lights, and the meaning (e.g., stop, proceed to turn left with caution, go, etc.) of the illuminated lights. The complexity of the relevant traffic signal refers to a quantification of an estimated difficulty for the driver 38 to understand the relevant traffic signal. For example, a standard three-light traffic signal located above a typical four-way intersection is assigned a complexity of one. A traffic signal having greater than three lights located above an intersection having a plurality of lanes is assigned a complexity of one hundred. In an exemplary embodiment, to determine the status and complexity of the relevant traffic signal using the image, the controller 14 uses a machine learning algorithm that has been trained to identify status and quantify complexity in a similar manner as is described above in reference to block 104. After block 108, the method 100 proceeds to block 112.

At block 110, the controller 14 uses the vehicle communication system 36 to establish a connection with and/or receive transmissions from the relevant traffic signal, as discussed above in reference to block 106. The relevant traffic signal, a controller in communication with the relevant traffic signal, and/or a remote database containing information about the relevant traffic signal transmit the status and complexity of the relevant traffic signal to the vehicle communication system 36. After block 110, the method 100 proceeds to block 112.

At block 112, the AR-HUD graphic 40 and/or TWD graphic is generated by the controller 14 based on the status and/or complexity of the relevant traffic signal. After block 112, the method 100 proceeds to block 114.

At block 114, a distance between the vehicle 12 and the relevant traffic signal is determined. In an exemplary embodiment, the distance is determined using the vehicle communication system 36 and the GPS 34 as discussed above in reference to block 104. In another exemplary embodiment, a machine learning algorithm is used to estimate the distance based on an image captured by the exterior camera 32. After block 114, the method 100 proceeds to block 116.

At block 116, the complexity of the relevant traffic signal determined at block 108 or block 110 is compared to a predetermined complexity threshold. In a non-limiting example, the predetermined complexity threshold is fifty. If the complexity of the relevant traffic signal is less than the predetermined complexity threshold, the method 100 proceeds to enter a standby state at block 118. If the complexity of the relevant traffic signal is greater than or equal to the predetermined complexity threshold, the method 100 proceeds to block 120.

At block 120, the distance between the vehicle 12 and the relevant traffic signal determined at block 114 is compared to a predetermined distance range. If the distance is outside of the predetermined distance range (i.e., greater than an upper bound of the predetermined distance range and less than a lower bound of the predetermined distance range), the method 100 proceeds to enter a standby state at block 118. If the distance is within the predetermined distance range (i.e., less than or equal to the upper bound of the predetermined distance range and greater than or equal to the lower bound of the predetermined distance range), the method 100 proceeds to block 122.

At block 122, the AR-HUD system 18, the TWD system 20, and or the HMI 22 display a graphic indicating the status and/or complexity of the relevant traffic signal. As discussed above in reference to FIG. 2, the AR-HUD system 18 calculates a size, shape, and location of the graphic based on data from the vehicle sensors 16 and the driver position tracking device 44. In an exemplary embodiment, the AR-HUD system 18 is used when the relevant traffic signal is within the first image plane 58 and/or the second image plane 60. If the relevant traffic signal is outside of the first image plane 58 and the second image plane 60, the TWD system 20 is used to display the graphic. In an exemplary embodiment where the AR-HUD system 18 and the TWD system are not available, the HMI 22 is used to display the graphic. After block 122, the method 100 proceeds to enter a standby state at block 118.

In an exemplary embodiment, the controller 14 may repeatedly exit the standby state 118 and restart the method 100 at block 102. By repeatedly performing the method 100, the displayed graphics are updated to account for motion of the vehicle 12 and changing status of the relevant traffic signal.

Figure 6A:
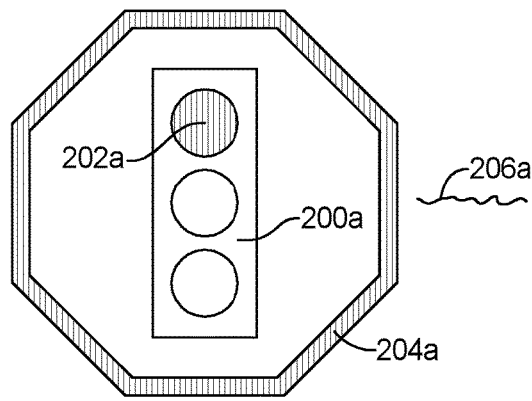
FIG. 6A is a diagram of an exemplary graphic overlayed on a standard traffic signal with a red light illuminated.
Figure 6B:
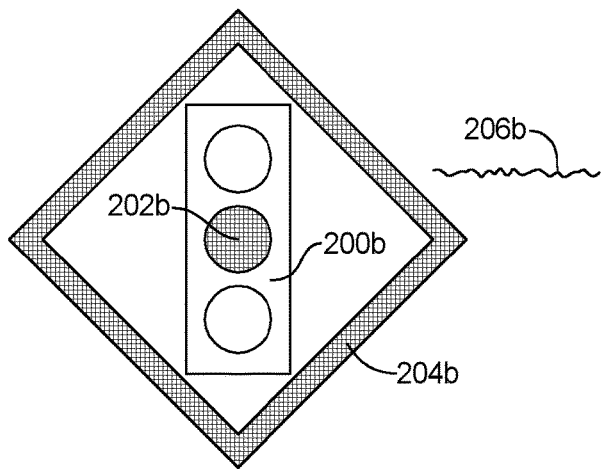
FIG. 6B is a diagram of an exemplary graphic overlayed on a standard traffic signal with a yellow light illuminated.
Figure 6C:
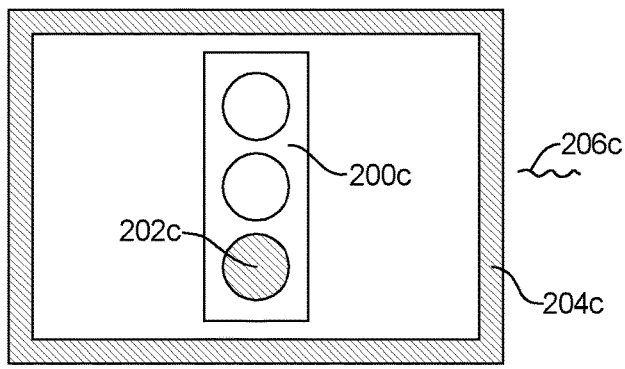
FIG. 6C is a diagram of an exemplary graphic overlayed on a standard traffic signal with a green light illuminated.

Referring to FIG. 6A, an exemplary graphic is shown overlayed on a standard traffic signal 200a. In the present disclosure, a standard traffic signal includes three lights, where a red light is proximal to a top edge of the standard traffic signal, a yellow light is proximal to a middle of the standard traffic signal, and a green light is proximal to a bottom edge of a traffic signal, as depicted in FIGS. 6A, 6B, and 6C. In some cases color-vision impaired people may distinguish a meaning of a standard traffic signal based on the position of the red, yellow, and green lights. In FIG. 6A, the red light 202a of the standard traffic signal 200a is illuminated. In an exemplary embodiment, the graphic includes a shape 204a and text 206a. The shape 204a is octagonal to indicate to the driver 38 that the red light 202a of the standard traffic signal 200a is illuminated. In a non-limiting example, the text 206a includes "RED" and/or "STOP" to further indicate to the driver 38 that the red light 202a of the standard traffic signal 200a is illuminated.

Referring to FIG. 6B, an exemplary graphic is shown overlayed on a standard traffic signal 200b. In FIG. 6B, the yellow light 202b of the standard traffic signal 200b is illuminated. In an exemplary embodiment, the graphic includes a shape 204b and text 206b. The shape 204b is a diamond to indicate to the driver 38 that the yellow light 202b of the standard traffic signal 200b is illuminated. In a non-limiting example, the text 206b includes "YELLOW" and/or "CAUTION" to further indicate to the driver 38 that the yellow light 202b of the standard traffic signal 200b is illuminated.

Referring to FIG. 6C, an exemplary graphic is shown overlayed on a standard traffic signal 200c. In FIG. 6C, the green light 202c of the standard traffic signal 200c is illuminated. In an exemplary embodiment, the graphic includes a shape 204c and text 206c. The shape 204c is a rectangle to indicate to the driver 38 that the green light 202c of the standard traffic signal 200c is illuminated. In a non-limiting example, the text 206c includes "GREEN" and/or "GO" to further indicate to the driver 38 that the green light 202c of the standard traffic signal 200c is illuminated.

Figure 7A:
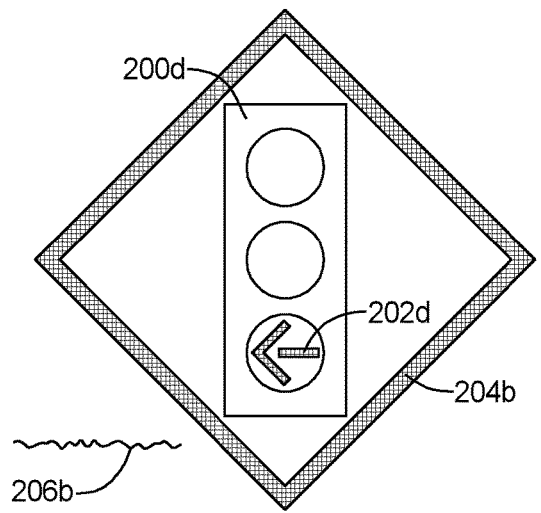
FIG. 7A is a diagram of an exemplary graphic overlayed on a non-standard traffic signal with a yellow arrow light illuminated.

Referring to FIG. 7A, an exemplary graphic is shown overlayed on a non-standard traffic signal 200d. In the present disclosure, a non-standard traffic signal is any traffic signal configured differently from a standard traffic signal. For example, a non-standard traffic signal may include more than three lights and/or lights positioned in different locations than the standard traffic signal described above. In another example, a non-standard traffic signal may include a standard traffic signal which is installed in a non-standard orientation (e.g., a horizontal traffic signal). In a horizontal traffic signal, the red light may be proximal to either a left side or a right side of the horizontal traffic signal, making interpretation more challenging for color-vision impaired people. In general, non-standard traffic signals may rely more heavily on color to convey meaning than standard traffic signals, thus making non-standard traffic signals more challenging to understand for color-vision impaired people. Therefore, non-standard traffic signals are assigned a higher complexity than standard traffic signals, as discussed above in reference to block 108 of the method 100. In FIG. 7A, the non-standard traffic signal 200d includes a yellow arrow 202d pointing towards the left located proximal to the bottom edge of the non-standard traffic signal 200d. Because of the position of the yellow arrow 202d, color-vision impaired people may incorrectly interpret the yellow arrow 202d as a green arrow. In an exemplary embodiment, the system 10 uses the method 100 to display a graphic including a shape 204b and text 206b overlayed on the non-standard traffic signal 200d. The shape 204b is a diamond and the text 206b includes "YELLOW" and/or "CAUTION" as discussed above.

Figure 7B:
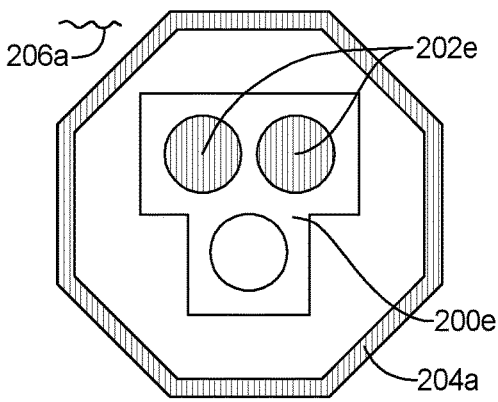
FIG. 7B is a diagram of an exemplary graphic overlayed on a non-standard traffic signal with two red lights illuminated.

Referring to FIG. 7B, an exemplary graphic is shown overlayed on a non-standard traffic signal 200e. In FIG. 7B, the non-standard traffic signal 200e includes three lights in a non-standard position and having non-standard colors. The two lights 202e located proximal to the top edge of the non-standard traffic signal 200e are illuminated red. Because of the non-standard shape and position of the non-standard traffic signal 200e, color-vision impaired people may incorrectly interpret the non-standard traffic signal 200e. In an exemplary embodiment, the system 10 uses the method 100 to display a graphic including a shape 204a and text 206a overlayed on the non-standard traffic signal 200e. The shape 204a is octagonal and the text 206a includes "RED" and/or "STOP" as discussed above.

Figure 7C:
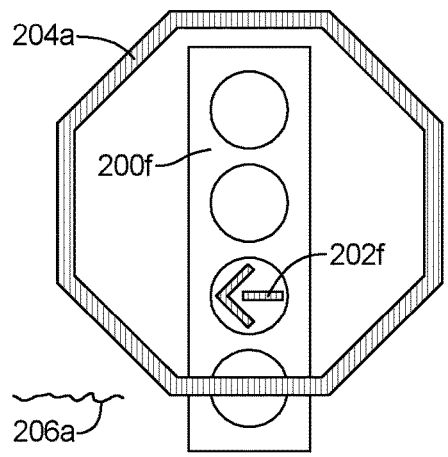
FIG. 7C is a diagram of an exemplary graphic overlayed on a non-standard traffic signal with a red arrow illuminated.

Referring to FIG. 7C, an exemplary graphic is shown overlayed on a non-standard traffic signal 200f. In FIG. 7C, the non-standard traffic signal 200f includes more than three lights, and a red arrow 202f pointing towards the left. Because of the position of the red arrow 202f, color-vision impaired people may incorrectly interpret the red arrow 202f. In an exemplary embodiment, the system 10 uses the method 100 to display a graphic including a shape 204a and text 206a overlayed on the non-standard traffic signal 200f. The shape 204a is octagonal and the text 206a includes "RED" and/or "STOP" as discussed above.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for displaying information for a vehicle, the system comprising:
   a plurality of vehicle sensors including at least an exterior camera and a vehicle communication system;
   a display; and
   a controller in electrical communication with the plurality of vehicle sensors and the display, wherein the controller is programmed to:
      detect a relevant traffic signal in an environment surrounding the vehicle using the plurality of vehicle sensors;
      determine a V2I (vehicle-to-infrastructure) status of the relevant traffic signal, wherein the V2I status includes a V2I available status and a V2I unavailable status;
      receive information about the relevant traffic signal using the exterior camera in response to determining that the V2I status of the relevant traffic signal is the V2I unavailable status;
      receive the information about the relevant traffic signal using the vehicle communication system in response to determining that the V2I status of the relevant traffic signal is the V2I available status;
      determine a status of the relevant traffic signal based on the received information; and
      display a graphic based on the status of the relevant traffic signal using the display.

2. The system of claim 1,
   wherein to detect the relevant traffic signal in the environment surrounding the vehicle, the controller is further programmed to:
      capture an image of the environment surrounding the vehicle using the exterior camera; and
      identify the relevant traffic signal by analyzing the image.

3. The system of claim 2, wherein to determine the status of the relevant traffic signal, the controller is further programmed to:
   determine a complexity of the relevant traffic signal using the image;
   identify one of a plurality of lights of the traffic signal as an illuminated light using the image; and
   determine a color of the illuminated light of the traffic signal using the image.

4. The system of claim 1, wherein:
   the plurality of vehicle sensors further comprises a global positioning system (GPS); and
   wherein to detect the relevant traffic signal in the environment surrounding the vehicle, the controller is further programmed to:
      determine a location of the vehicle using the GPS;
      receive a transmission from a traffic signal using the vehicle communication system, wherein the transmission contains a location of the traffic signal;
      compare the location of the vehicle to the location of the traffic signal; and
      determine the traffic signal to be the relevant traffic signal based on the comparison of the location of the vehicle and the location of the traffic signal.

5. The system of claim 4, wherein to receive information about the relevant traffic signal using the plurality of vehicle sensors, the controller is further programmed to:
   receive a transmission from the relevant traffic signal using the vehicle communication system, wherein the transmission contains information about the relevant traffic signal.

6. The system of claim 5, wherein to determine the status of the relevant traffic signal, the controller is further programmed to:
   determine a complexity of the relevant traffic signal based on the transmission;
   identify one of a plurality of lights of the relevant traffic signal as an illuminated light based on the transmission; and
   determine a color of the illuminated light of the relevant traffic signal based on the transmission.

7. The system of claim 4, wherein to receive information about the relevant traffic signal using the plurality of vehicle sensors, the controller is further programmed to:
   transmit a request to a remote database using the vehicle communication system, wherein the request includes a request for information about the relevant traffic signal; and
   receive a transmission from the remote database using the vehicle communication system, wherein the transmission includes at least one of: a complexity of the relevant traffic signal, an illuminated light of the relevant traffic signal, and a color of the illuminated light of the relevant traffic signal.

8. The system of claim 1, wherein the display is an augmented reality head-up display (AR-HUD) system in electronic communication with the controller, wherein the AR-HUD system includes a driver position tracking device and an AR-HUD projector, and wherein to display the graphic the controller is further programmed to:
   determine a position of a driver of the vehicle using the driver position tracking device;
   calculate a size, shape, and location of the graphic based on the position of the driver and data from the plurality of vehicle sensors; and
   display the graphic corresponding to the status of the relevant traffic signal on a windscreen of the vehicle using the augmented reality head up display system based on the size, shape, and location.

9. The system of claim 8, wherein the display further includes a transparent windscreen display (TWD) system in electronic communication with the controller, wherein the transparent windscreen display system includes transparent phosphors embedded in the windscreen of the vehicle and a TWD projector, and wherein to display the graphic the controller is further programmed to:
   calculate the size, shape, and location of the graphic based on data from the plurality of vehicle sensors; and
   display the graphic corresponding to the status of the relevant traffic signal on the windscreen of the vehicle using the TWD system based on the size, shape, and location.

10. The system of claim 1, wherein to display the graphic the controller is further programmed to:
    update the graphic based on at least one of: a location of the vehicle and a complexity of the relevant traffic signal.

11. A method for displaying information upon a windscreen of a vehicle, the method comprising:
    detecting a relevant traffic signal in an environment surrounding the vehicle using a vehicle sensor;

receiving information about the relevant traffic signal using the vehicle sensor, wherein receiving information about the relevant traffic signal further comprises:
  determining a V2I (vehicle-to-infrastructure) status of the relevant traffic signal, wherein the V2I status includes a V2I available status and a V2I unavailable status;
  capturing an image of the relevant traffic signal using an exterior camera in response to determining that the V2I status of the relevant traffic signal is the V2I unavailable status; and
  receiving a transmission from a traffic signal using a vehicle communication system in response to determining that the V2I status of the relevant traffic signal is the V2I available status, wherein the transmission includes at least one of: a complexity of the relevant traffic signal, an illuminated light of the relevant traffic signal, and a color of the illuminated light of the relevant traffic signal;
determining a status of the relevant traffic signal based on the received information; and
displaying a graphic based on the status of the relevant traffic signal.

12. The method of claim 11, wherein detecting a relevant traffic signal further comprises:
  capturing an image of the environment surrounding the vehicle using an exterior camera; and
  identifying the relevant traffic signal by analyzing the image.

13. The method of claim 11, wherein detecting a relevant traffic signal further comprises:
  determining a location of the vehicle using a global positioning system (GPS);
  receiving a transmission from a traffic signal using a vehicle communication system, wherein the transmission contains a location of the traffic signal;
  comparing the location of the vehicle to the location of the traffic signal; and
  determining the traffic signal to be the relevant traffic signal based on the comparison of the location of the vehicle and the location of the traffic signal.

14. The method of claim 11, wherein determining the status of the relevant traffic signal further comprises:
  determining the complexity of the relevant traffic signal using at least one of: the image and the transmission;
  identifying one of a plurality of lights of the traffic signal as the illuminated light using at least one of: the image and the transmission; and
  determining a color of the illuminated light of the traffic signal using at least one of: the image and the transmission.

15. The method of claim 14, wherein displaying the graphic further comprises:
  determining a distance between the vehicle and the relevant traffic signal using at least one of: the image, the transmission, and a global positioning system (GPS);
  comparing the distance between the vehicle and the relevant traffic signal to a predetermined distance range;
  comparing the complexity of the relevant traffic signal to a predetermined complexity threshold; and
  displaying the graphic in response to determining that the distance between the vehicle and the relevant traffic signal is within the predetermined distance range and that the complexity of the relevant traffic signal is greater than or equal to the predetermined complexity threshold.

16. The method of claim 15, wherein displaying the graphic further comprises:
  calculating a size, shape, and location of the graphic based on data from at least one of: the exterior camera, the global positioning system (GPS) and a driver position tracking device; and
  displaying the graphic corresponding to the status of the relevant traffic signal on the windscreen of the vehicle using at least one of: a transparent windscreen display (TWD) system and an augmented reality head-up display (AR-HUD) system based on the size, shape, and location.

17. A system for displaying information for a vehicle, the system comprising:
  a plurality of vehicle sensors including an exterior camera, a global positioning system (GPS), and a vehicle communication system;
  a display system including an augmented reality head-up display (AR-HUD) system and a transparent windscreen display (TWD) system; and
  a controller in electrical communication with the plurality of vehicle sensors and the display system, wherein the controller is programmed to:
    detect a relevant traffic signal in an environment surrounding the vehicle using the plurality of vehicle sensors;
    determine a V2I (vehicle-to-infrastructure) status of the relevant traffic signal, wherein the V2I status includes a V2I available status and a V2I unavailable status;
    receive a status, a complexity, and a location relative to the vehicle of the relevant traffic signal using the exterior camera in response to determining that the V2I status of the relevant traffic signal is the V2I unavailable status;
    receive the status, the complexity, and the location relative to the vehicle of the relevant traffic signal using the vehicle communication system in response to determining that the V2I status of the relevant traffic signal is the V2I available status; and
    display a graphic based on the status, the complexity, and the location relative to the vehicle of the relevant traffic signal using the display system.

18. The system of claim 17, wherein to detect the relevant traffic signal, the controller is further programmed to:
  capture an image of the environment surrounding the vehicle using the exterior camera; and
  analyze the image using a machine learning algorithm to identify the relevant traffic signal.

19. The system of claim 17, wherein to display the graphic, the controller is further programmed to:
  display the graphic indicating the status of the relevant traffic signal based on the complexity and the location relative to the vehicle of the relevant traffic signal, wherein the status of the relevant traffic signal includes an illuminated light and a color of the illuminated light.

* * * * *